United States Patent [19]
Marsh et al.

[11] B 3,986,609
[45] Oct. 19, 1976

[54] MICROFICHE FILM PACK

[75] Inventors: James Michael Marsh, Yorba Linda; William R. Swift, Placentia, both of Calif.

[73] Assignee: Addressograph-Multigraph Corporation, Cleveland, Ohio

[22] Filed: July 19, 1974

[21] Appl. No.: 490,067

[44] Published under the second Trial Voluntary Protest Program on January 27, 1976 as document No. B 490,067.

[52] U.S. Cl. .............................. 206/455; 206/484; 250/475; 250/478; 354/277
[51] Int. Cl.² .................. B65D 85/00; G03B 17/26; G03B 41/18
[58] Field of Search ............ 206/455, 484; 354/277, 354/276; 250/475, 478

[56] References Cited
UNITED STATES PATENTS

| | | | |
|---|---|---|---|
| 1,536,341 | 5/1925 | Hodgson | 250/478 |
| 2,663,418 | 12/1953 | Grunwald | 206/455 |
| 3,338,400 | 8/1967 | Edgworth et al. | 206/484 X |

FOREIGN PATENTS OR APPLICATIONS

| | | | |
|---|---|---|---|
| 1,076,834 | 3/1960 | Germany | 250/475 |
| 231,487 | 11/1925 | United Kingdom | 206/455 |

Primary Examiner—Leonard Summer

[57] ABSTRACT

A microfiche film pack having a pair of opaque covers, one of which is formed with an offset portion providing a pocket. A sheet of photosensitive material is partially positioned in said pocket, and has a tab which extends from the pocket, there being a light trap in the form of elongated indentations in said covers on opposite sides of said photosensitive sheet. The tab near the indentations is formed with several apertures through which the covers are bonded to each other to cooperate with the indentations in providing the light trap.

The covers are provided with an end portion to be held in fixed position relative to the tab on the photosensitive sheet to enable the latter to be pulled from the pocket in the covers.

4 Claims, 6 Drawing Figures

U.S. Patent   Oct. 19, 1976   3,986,609
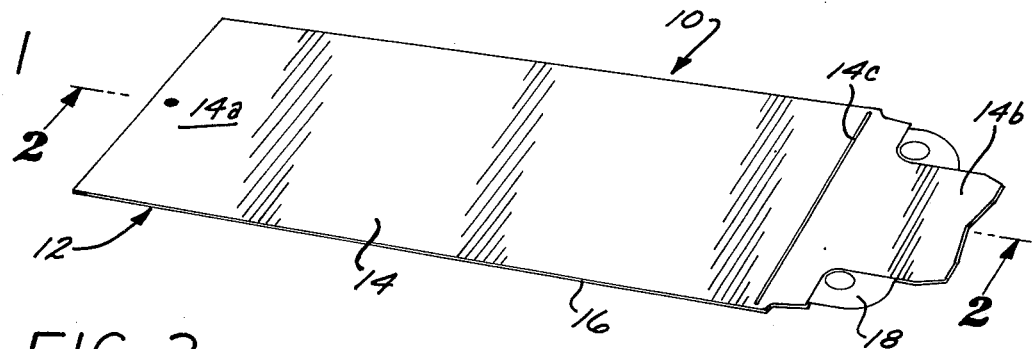
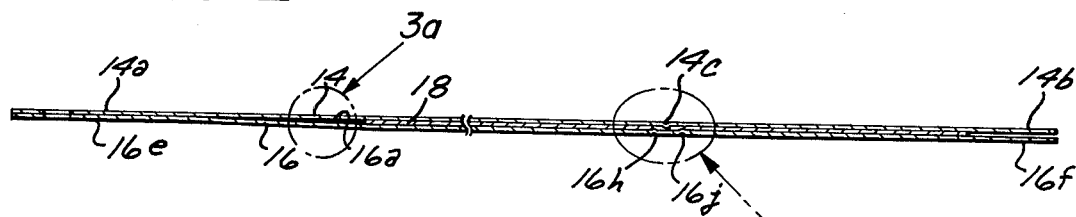
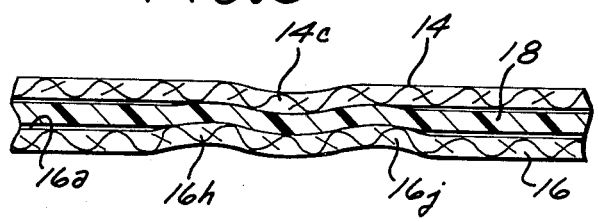
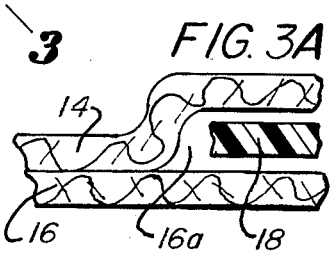
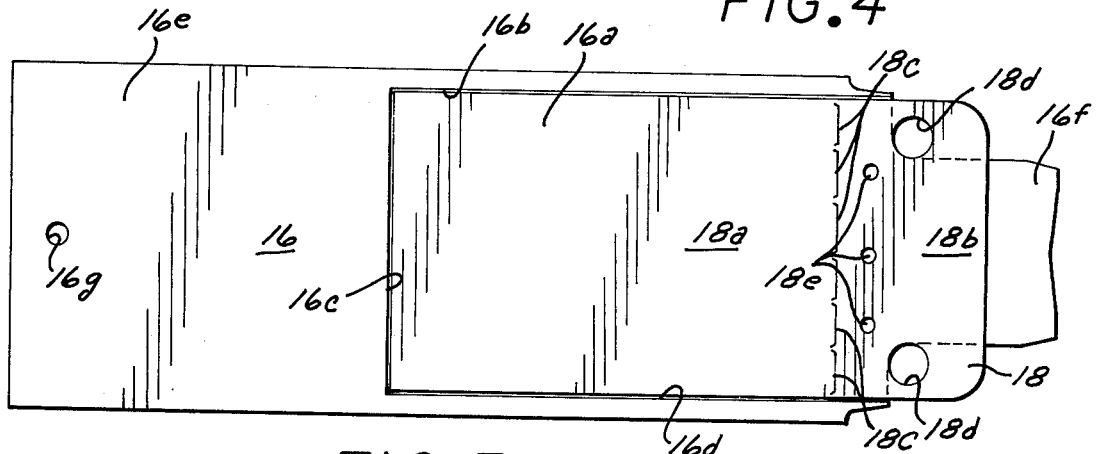
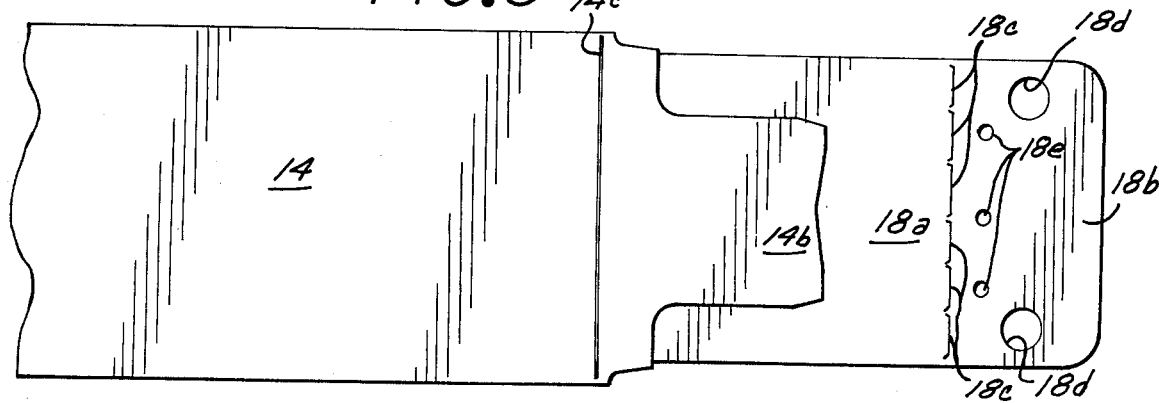

MICROFICHE FILM PACK

The present invention relates generally to microfiche film packs, but more particularly to film packs whereby a sheet of photosensitive material can be quickly and easily removed for use.

In the microfilming of information and data, an activity which has become extremely important in our modern technological society, it is usually necessary to employ relatively large sheets of film. Typically, such sheets will be on the order of four inches by six inches and will carry the photographic impressions of a great many different pieces of information and data.

The individual miniaturized images on such a sheet of film are provided thereon through the use of a special camera, and the images can be individually viewed through the use of a specialized viewer having means for locating each individual frame or image, as desired. As will be readily understood by those persons skilled in the art, this process enables much information to be stored in a relatively small space, while nonetheless providing easy access thereto.

In the process of making such microfiche in the specialized camera, it is necessary to provide packs of film to enable the photographing process to be automated. To accomplish this, it has been the desire to provide a microfiche film pact which can be quickly and easily inserted into the camera and which is relatively inexpensive to manufacture.

Prior film packs of this nature have been somewhat awkward and cumbersome to use and have been so constructed as to be relatively expensive, even in large quantities.

In view of the foregoing, it is an object of the present invention to provide a microfiche film pack having a pair of opaque covers between which a photosensitive sheet is positioned, and from which it can be removed quickly and easily.

A further object of the present invention is to provide a microfiche film pack as characterized above wherein one of the covers is provided with an offset portion providing a pocket, and said covers are sealed together about three marginal edges of the photosensitive sheet, the remaining side or edge of such sheet having a light trap adjacent thereto formed in the covers and through which the film can be removed.

A still further object of the present invention is to provide a microfiche film pack as characterized above wherein the light trap comprises a plurality of cooperating indentations on said covers, as well as one or more apertures in the photosensitive sheet thereat through which the covers may be bonded to each other.

A still further object of the present invention is to provide a microfiche film pack as characterized above which is inserted into automatic camera means and the photosensitive sheet is enabled to be automatically, with the use of mechanical apparatus for that purpose, removed from the covers, without the need for any manual assistance.

An even further object of the present invention is to provide a microfiche film pack as characterized above which is simple and inexpensive to manufacture and which is rugged and dependable in operation.

The novel features which are considered characteristic of this invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a perspective view of a film pack according to the present invention;

FIG. 2 is a fragmentary longitudinal sectional view through the film pack, taken substantially along line 2—2 of FIG. 1;

FIG. 3 is a fragmentary sectional view, from area 3 of FIG. 2;

FIG. 3a is a fragmentary sectional view from area 3a of FIG. 2.

FIG. 4 is an elevational view of the film pack, with one cover removed; and

FIG. 5 is a fragmentary elevational view showing the photosensitive sheet partially removed from the enclosure.

Like reference characters indicate corresponding parts throughout the several views of the drawing.

Referring to FIG. 1 in the drawings, there is shown therein a film pack 10 according to the present invention. It comprises an enclosure 12 having a pair of oppositely disposed covers 14 and 16, and a photosensitive sheet 18.

The covers 14 and 16 may be made of any opaque sheet material which can be shaped or formed as will hereinafter be explained, but for the sake of economy, it has been found preferable to make such covers of opaque black paper or thin cardboard. In fact, such paper is available with a plastic coating which renders the surface of the paper smooth and which can be employed as a bonding agent as will hereinafter be explained.

As shown most clearly in FIG. 3a and FIG. 4 of the drawings, the cover 16 is formed with an offset portion 16a by virtue of deformations 16b, 16c and 16d. Thus, the offset portion 16a provides a three-sided pocket in the cover 16. A relatively large end portion 16e is provided to enable the film pack to be firmly gripped with mechanical means as will hereinafter become more apparent.

Cover 16 is also provided with an extension 16f of reduced width to accomodate means for gripping the photosensitive sheet 18.

The cover 14 is of substantially identical size and shape as cover 16, but need not be formed with the aforedescribed offset portion 16a, but rather, cooperates therewith when the covers are placed together to form a pocket therebetween. However, should it be desired to provide each of the covers 14 and 16 with substantially identical offset portions, the desired pocket could be provided in that manner.

The cover 14 is provided with an end portion 14a which is juxtaposed with respect to the end portion 16e of cover 16. Cover 14 also is provided with an extension 14b which conforms to and matches the extension 16f of cover 16.

To facilitate storage of the film pack 10 as well as to provide means for being gripped by automatic machiners, for that purpose each of the end portions of the covers 14 and 16 is provided with an opening as shown at 16g in FIG. 4 of the drawings.

The photosensitive sheet 18 is formed with a main portion 18a and a tab 18b. The main portion 18a may be of substantially any size, but is usually rectangular and approximately four inches by six inches. The tab 18b is separated from the main portion 18a by a plurality of perforations or slits 18c across the entire width of the photosensitive sheet whereby the tab can be removed from the main portion 18a after the latter has been properly exposed with the appropriate photographic images. Such resulting microfiche may then be suitably mounted to be stored and ready for viewing as desired.

The tab 18b is further provided with a pair of holes 18d which are adapted to receive gripping means in the form of pins in the mechanism (not shown) whereby the sheet 18 is extracted from the enclosure 12.

The covers 14 and 16 are provided with a suitable plastic coating which, as above mentioned, can be used as the bonding agent for forming the enclosure 12. With the plastic coatings of the covers 14 and 16 in contact, application of heat and pressure to the covers adjacent the marginal edges of the photosensitive sheet 18 provides a firm light-tight seal. In this way, the edges of the covers adjacent deformations 16b, 16c and 16d are firmly secured together. Also, the end portions 14a and 16e are, at the same time, firmly secured together.

To provide a light-tight seal across the other end of the main body 18a of photosensitive sheet 18, the several covers 14 and 16 are individually provided with suitable indentations as shown in FIGS. 2 and 3 of the drawings. As shown most clearly in FIG. 3, the cover 16 is provided with a pair of substantially parallel spaced and elongated indentations 16h and 16j which have their deformation extending toward the sheet 18 and cover 14. Such indentations 16h and 16j extend the entire width of the cover 16.

The cover 14 is formed with a single indentation 14c which is substantially parallel to the aforementioned indentations 16h and 16j and is positioned approximately midway therebetween as shown in FIG. 3 of the drawings. Such indentation 14c is deformed toward the sheet material 18 and cover 16, and extends the entire width of cover 14.

The three indentations 16h, 14c and 16j cooperate to provide a circuitous path for light entering the pocket afforded by offset portion 16a. However, to maintain such indentations in close contact with photosensitive sheet 18, the latter is formed with three spaced apertures 18e, through which the covers 14 and 16 are bonded to each other. Such apertures 18e are in close proximity to the indentations 16h, 14c and 16j when sheet 18 is within pocket 16a so that the bonding together of the covers 14 and 16 through such apertures urges the said indentations in light-tight sealing engagement with the film sheet 18. Such apertures 18e are spaced along the width of the film sheet 18 to provide an effective light trap or barrier therealong.

When it is desired to remove the photosensitive sheet 18 from the pocket of enclosure 12, the end portions of the covers 14 and 16 need only be held in place while the removal mechanism of the camera pulls the tab 18b. Such pulling causes the small bonds through the apertures 18e to be broken and the main portion 18a of film sheet 18 to be pulled through the light trap afforded by the abovementioned indentations. When this is done, the covers 14 and 16 can be discarded and the photosensitive sheet 18 transported to the proper film position in the camera.

After the photographic images have been properly provided on the main portion 18a, the tab 18b may be removed therefrom by breaking or tearing the sheet material between the perforations or slits 18c.

It is thus seen that the subject invention provides a microfiche film pack which is inexpensive to manufacture and use, and which is effective in storing unexposed photosensitive material until the proper time. Also, such film pack and photosensitive material can be handled with automatic mechanical means.

Although we have shown and described certain specific embodiments of our invention, we are well aware that many modifications thereof are possible.

We claim:

1. A microfiche film pack comprising in combination:
    a pair of oppositely disposed opaque covers one of which is formed with an offset portion providing a three-sided pocket;
    a sheet of photosensitive material between said covers and partially enclosed within said pocket;
    means sealing together said covers along the sides of said pocket; and
    a light trap formed by means of parallel cooperating indentations in said covers and said sheet extending the width of said oppositely disposed covers adjacent that portion of said photosensitive material not enclosed within said pocket.

2. A microfiche film pack according to claim 1 wherein said light trap comprises a pair of spaced substantially parallel elongated indentations on one of said covers and an elongated indentation on the other of said covers between said pair of indentations on said one cover.

3. A microfiche film pack according to claim 1 wherein said light trap further includes at least one aperture in said sheet and means bonding said covers together through said aperture.

4. A microfiche film pack according to claim 1 wherein said photosensitive sheet is formed with a plurality of aligned perforations dividing said sheet into a main portion and a tab, said tab being formed with means to be gripped for pulling said sheet from said pocket.

* * * * *